United States Patent [19]

Beer et al.

[11] Patent Number: 4,747,961
[45] Date of Patent: May 31, 1988

[54] METHOD AND SYSTEM FOR TREATING DRILL CUTTING SLURRIES AND THE LIKE

[75] Inventors: Gary L. Beer; Ying H. Li, both of Plano, Tex.

[73] Assignee: Atlantic Richfield Company, Los Angeles, Calif.

[21] Appl. No.: 944,644

[22] Filed: Dec. 19, 1986

[51] Int. Cl.$^4$ .......................... B01D 33/16; F26B 3/18
[52] U.S. Cl. .................................... 210/770; 210/784; 210/806; 210/297; 210/298; 210/396; 210/402; 210/406; 175/66; 175/206; 175/207
[58] Field of Search ............... 210/747, 769, 770, 775, 210/779, 784, 805, 806, 170, 171, 216, 217, 297, 298, 326, 396, 397, 402, 406; 175/66, 206, 207

[56] References Cited

U.S. PATENT DOCUMENTS

| | | | |
|---|---|---|---|
| 3,159,670 | 12/1964 | Logan | 210/784 |
| 3,258,391 | 6/1966 | Cornell et al. | 210/402 |
| 3,288,288 | 11/1966 | Horton et al. | 210/784 |
| 3,688,781 | 9/1972 | Talley, Jr. | 210/216 |
| 4,319,410 | 3/1982 | Heilhecker et al. | 175/207 |
| 4,511,468 | 4/1985 | White | 210/402 |
| 4,649,655 | 3/1987 | Witten | 175/206 |

Primary Examiner—Peter Hruskoci
Assistant Examiner—Richard D. Jordan
Attorney, Agent, or Firm—Michael E. Martin

[57] ABSTRACT

Drill cuttings, and similar slurries or mixtures oily solid particles, are treated by a dryer apparatus which vaporizes the liquid and discharges relatively large solid particles for disposal. Vapor and entrained solid fines are conveyed from the dryer to a condenser and then to a rotary drum vacuum filter having a precoated filter media disposed thereon. The solid fines are filtered by the filter media comprising diatomaceous earth or perlite and the clarified condensed liquid is conveyed to separator means for separating oil, water and any other liquids present. The filter media stripped from the filter and contaminated with entrapped solid fines is conveyed through the dryer means and disposed with the solids particles being discharged from the dryer. The system is particularly adapted for offshore drilling operations wherein the dried solids comprising drill cuttings and diatomaceous earth may be discharged to the sea after separation from all contaminants such as oil and other liquids in the drilling fluid.

18 Claims, 2 Drawing Sheets

METHOD AND SYSTEM FOR TREATING DRILL CUTTING SLURRIES AND THE LIKE

BACKGROUND OF THE INVENTION

1. Field of the Invention

The present invention pertains to a method and system for treating well drilling cuttings and similar slurries of oily solids wherein the slurry is subjected to a drying process and wherein a mixture of liquid having residual solid fines entrained therein is processed through a rotary vacuum type filter, particularly a precoat type filter.

2. Background

The generation of oil and gas well drill cuttings slurries and similar slurries of oily liquids and solids has presented longstanding problems with respect to suitable treatment and disposal methods which are environmentally acceptable.

Slurries of oily liquid and solids mixtures may be subjected to a drying process wherein the material is exposed to a relatively intense heat source and agitated to thoroughly evaporate as well as sometimes chemically alter the liquids present in the slurry. The dried solids may then be discharged directly back to the environment, particularly in the case of earth drill cuttings. However, the vapors produced in such drying processes must be treated further since they normally include entrained solids fines and such vapors are either not acceptable for direct discharge into the atmosphere or can be reused in a drilling process or the like. To this end, several attempts have been made to provide condensing and separating processes for the vapors produced by the slurry drying process. However, the fineness of the solids mixed or entrained with the vapors, in many cases, is such that these solids are not easily separated by a gravity type separator or by a direct impingement type separator since the characteristics of the solids fines tend to blind or clog the impingement type filter media.

One important application of drill cuttings treatment systems is in offshore drilling operations wherein, if the dried drill cuttings solids have been rid of oil or other contaminants, they may usually be discharged directly back into the sea. In like manner, dried drill cuttings solids from land based drilling operations may also be discharged directly onto the earth's surface if they have been suitably rid of oil or other contaminating substances.

Accordingly, there has been a continuing effort to develop an improved treatment method and system for oily solids wastes, such as drill cuttings slurries and other slurries of solids and oily liquid mixtures, wherein the solids are completely rid of hydrocarbon substances or other substances which are not suitable for discharge directly into the environment but which are capable of being separated from the solids. The type of process and system being sought has also included the constraint that the system must be relatively compact and not require further transport or treatment of the materials discharged from the system. It is to this end that the present invention has been developed.

SUMMARY OF THE INVENTION

The present invention provides an improved system for treating slurries containing oily liquids and solids, such as earth drill cuttings and the like, wherein the liquids are separated from the solids by a vaporization process and the dried solids may be, in many instances, discharged directly into the ecosystem.

In accordance with one aspect of the present invention, there is provided a drill cuttings and similar type slurries treatment process wherein the slurry is passed through a drying apparatus which vaporizes the liquid portion of the slurry and discharges dried solids. The vapors generated in the drying process, which include entrained solids fines, are condensed and subjected to a further separation or filtering process, including a rotary vacuum type filter of the so-called precoat type which utilizes a filtering medium made up of a slurry-like material coated on a support element. The slurry-like precoat material entraps the solids fines from the condensed vapor/fines mixture and the precoat material with entrapped solids fines is then recirculated through the drying apparatus for discharge with the dried cuttings or similar solids.

In accordance with another important aspect of the present invention, there is provided a system for treating solids fines from oily waste slurries and the like wherein a filter media is used for filtering the fines which may be further treated with the fines themselves in preparation for disposal.

In accordance with yet a further important aspect of the present invention, there is provided a drill cuttings treatment system and method for use in offshore, as well as onshore, drilling operations wherein solid fines of earth material are separated from condensed vapors by a filter media comprising diatomaceous earth, perlite and the like, wherein the mixture of filter media and entrapped solids fines may be further treated to remove oil and other liquids which may not be discharged directly into the environment so that the mixture of drill cuttings fines and filter media, when separated from the undesirable liquids, may be discharged directly into the sea or returned to the earth. Moreover, the removal of solids fines from an oil/water mixture permits separation of oil and water by conventional methods.

Those skilled in the art will appreciate the abovementioned features and advantages of the present invention, together with other superior aspects thereof upon reading the detailed description which follows in conjunction with the drawing.

DESCRIPTION OF PREFERRED EMBODIMENTS

Figure 1:
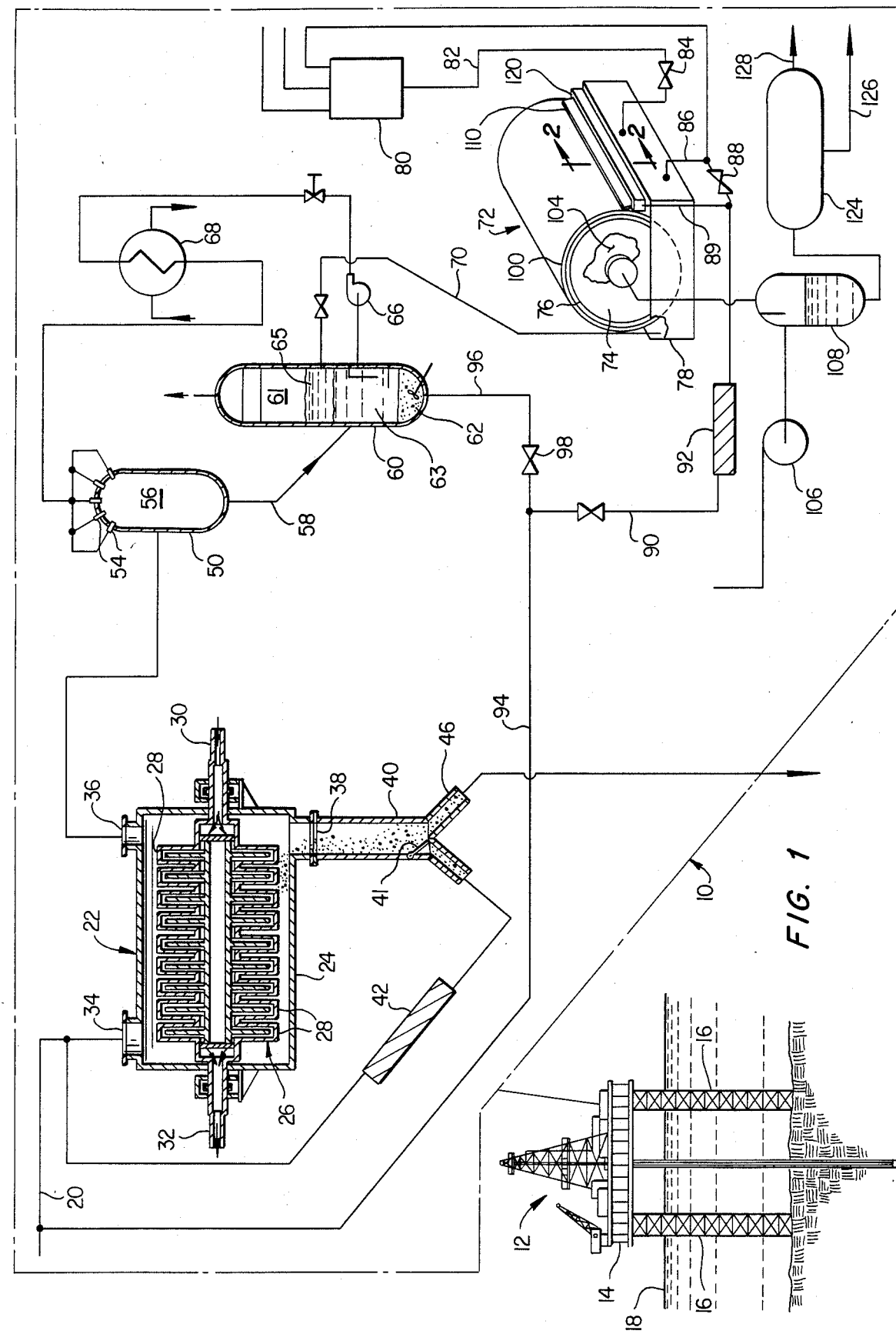
FIG. 1 is a schematic diagram of an improved system for treating drill cuttings slurries and the like in accordance with the present invention.

In the description which follows, like parts are marked throughout the specification and drawing with the same reference numerals, respectively. The drawing figures are not to scale and most of the features of the drawing are shown in somewhat schematic form in the interest of clarity and conciseness.

Referring to FIG. 1, there is illustrated a system for treating earth drill cuttings and the like to separate solid particles from a mixture of solids, oil and water. The system illustrated in FIG. 1, and generally designated by the numeral 10, is particularly adapted for use in conjunction with treating drill cuttings from offshore drilling operations such as may be performed by an offshore drill rig 12. The drill rig 12 includes a platform 14 supported on suitable supports 16 above the surface of the sea 18. The drilling rig 12 includes conventional drilling equipment and a circulation system, not shown, for recirculating the drill cuttings evacuation fluid or "mud". The mud circulation system is mounted on the platform 14 and includes the system 10 for treating the drill cuttings in the form of slurry-like mixture which is separated from the circulation fluid and the conventional circulation system. Although the present invention is particularly useful for offshore well drilling operations, as well as onshore well drilling operations, those skilled in the art will recognize that the improvements provided by the system 10 may be utilized in treating various types of solids and oily liquid slurries, such as refinery waste streams, chemical processing waste streams, tanker ballast water and similar types of slurries.

The system 10, in conjunction with the drilling rig 12, is particularly adapted to receive the drill cuttings slurry which has been separated from the recirculating drilling fluid and is charged into a feed stream 20 leading to a dryer apparatus generally designated by the numeral 22. The dryer apparatus 22 is particularly advantageously used in treating drill cuttings slurries and is characterized by a housing 24 in which a rotor 26 is disposed and is characterized by a plurality of spaced apart hollow circular disks 28. The disks 28 are adapted to receive a flow stream of hot fluid which enters the rotor 26 at one end 30 and is discharged at the opposite end 32 for recirculation through a heat source. The aforementioned fluid may be circulated in a way, not shown, which heats the housing 24, also. The dryer 22 includes an inlet port 34, a fluid vapor discharge port 36, and a dried solids discharge port 38.

Dried solids particles of a size which, by mechanical and gravity flow, are discharged into the port 38 proceed through a conduit 40, which may be controlled by suitable valve means 41, to be partially recirculated back to the inlet port 34 by way of a conveyor 42 to adjust the consistency of the slurry mix entering the inlet port 34. At least a major portion of the dried cuttings are suitably discharged directly into the sea or to means, not shown, for transport to a suitable disposal site by way of the conduit branch 46.

The process of drying the drill cuttings or similar solids generates a substantial amount of vapor as the liquids of the slurry are driven off, primarily by evaporation. Moreover, the solids fines resulting from various types of earth formations being drilled and from the drilling fluid additives may consist of certain claylike substances which are light enough to be carried off with the vapor flow exiting the dryer 22 through the discharge port 36. This flowstream of vapor and entrained solids fines is conveyed by a conduit 48 to a condenser 50. The condenser 50 is characterized as a closed vessel having an arrangement of liquid spray nozzles 54 discharging into a chamber 56 for condensing the vapor and entrained fines flow stream entering the chamber. The condenser 50 may include sieve trays or the like, not shown.

The condensed mixture of liquids and solids fines is discharged from the condenser 50 through a conduit 58 into a collection or surge tank 60 which will provide for some separation of the heavier solids fines 62 which may collect at the bottom of the tank. However, the fineness and density of the solids typically driven off with vapors from the dryer 22 are such that they remain in suspension or in an emulsionlike form with the liquids. The oil-water-solids mixture discharged from the condenser 50 into a chamber 61 formed within the collection or surge tank 60, must be subjected to further treatment to separate the oil and water from each other and from the solids fines.

Typically, a layer 63 of relatively clarified liquid may exist in the chamber 61 while a sometimes frothy layer 65 containing a higher concentration of solids fines will rise to the surface of the mixture in the chamber. Accordingly, the condenser 50 may utilize a fluid stream taken from the larger 63 of relatively clarified liquid in the surge tank 60 and discharged by way of a pump 66 through a heat exchanger 68 and recirculated to the array of nozzles 54 for use as the condensing fluid. The heat exchanger 68 may utilize sea water as the heat exchange medium for cooling the fluid stream being recirculated from the surge tank 60 through the heat exchanger 68 and the nozzle array 54 to the condenser 50.

Further in accordance with the present invention, a mixture of oil, water (or other liquids), and solids fines in the surge tank 60, preferably from the layer 65, is discharged through a conduit 70 to a rotary drum vacuum type filter of a type which uses a precoat filter media for separating relatively fine solid particles from liquids or slurrylike substances. The rotary drum vacuum filter is generally designated by the numeral 72 and is characterized by a rotating drum 74 having a suitable support structure, not shown, and a cylindrical filter media support member 76 comprising a somewhat screenlike structure. The drum 74 is supported for rotation in a tank 78 into which the liquid and fines mixture from the tank 60 may be discharged by way of the conduit 70. The tank 78 is also in communication with a source of precoat filter media comprising a tank 80 which is connected to the tank 78 by a conduit 82 having a suitable shut-off valve 84 interposed therein. The tank 78 may also be drained by way of a conduit 86 having a shut-off valve 88 interposed therein and in communication with a conduit 90 and a suitable conveyor or pump, generally designated by the numeral 92. The pump or conveyor 92 is in communication with the feed conduit 20 by way of a conduit 94. Solids collected in the bottom of the surge tank 60 may also be conveyed through the conduit 94 by way of a branch conduit 96 having a suitable shut-off valve 98 interposed therein.

The filter or separator 72 may be of a type commercially available such as from the Envirotech Corporation, Salt Lake City, Utah. The filter drum 74 is preferably precoated with a slurry-like filter media to form a coating 100 of filter media which may be provided by filling the tank 78 with the precoat media and rotating the drum 74 to collect the media on the surface of the element 76. When a suitable coating 100 is applied to the drum 74, the tank 78 may be drained of precoat material through conduits 86 and 88 or 93 and prepared for receiving the material to be filtered.

Figure 2:
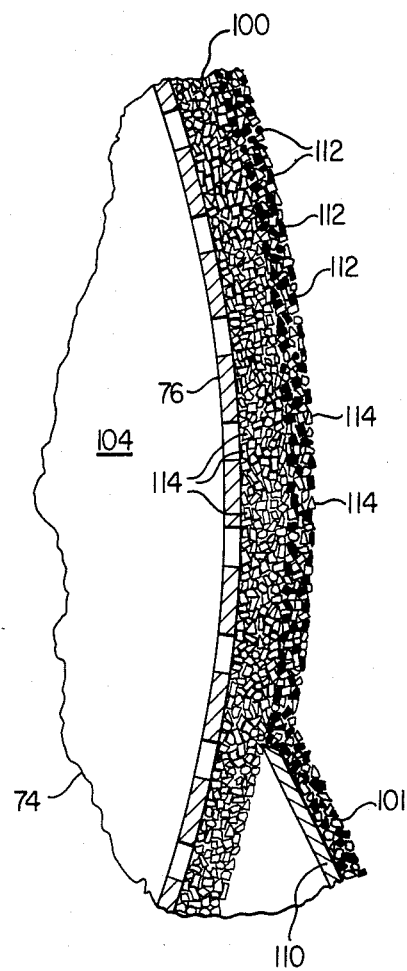
FIG. 2 is a detailed, somewhat schematic view illustrating the operation of the filter media and the filter apparatus used for separating the solids fines in the system of FIG. 1.

Filtration of the liquid-solids slurry is carried out by drawing a vacuum on the drum interior space 104 formed by the drum 74 by a vacuum pump 106 connected to a liquid receiver tank 108. As the liquid/solids mixture is filtered through the media coating 100, the solids fines are collected by the filter media and, before the media is blinded by the collection of solids, the coating 100 is continuously shaved to reduce the coating or layer thickness by an elongated knife blade 110. FIG. 2 illustrates in somewhat schematic form the way in which the filter media coating or layer 100 is continuously renewed by shaving a relatively thin layer 101 of the media off the coating 100 as the drum 74 is rotated. As shown in FIG. 2, a layer of precoated filter media 100 entraps the solid fines 112 between the solid particles 114 of the precoated filter media which typically comprises diatomaceous earth. As the drum 74 rotates, the knife edge 110 shaves off layer 101 from the coating 100 which has the greatest density of accumulation of solids 112. This layer of precoated filter material and collected solids is discharged into a trough 120, FIG. 1, and is conveyed by way of the conduit 90, the conveyor 92 and the conduit 94, to the feed stream conduit 20 leading to the dryer 22. The knife 110 is connected to a suitable mechanism, not shown, for advancing the knife through the filter media layer 100 until the layer is shaved down to a thickness which requires replacement. The filtered liquids such as oil and water withdrawn through the filter drum 74 into the tank 108 may then be discharged to a suitable separator 124, FIG. 1, for separation of the water and oil into separate discharge streams. Both of the streams 126 and 128 may be reused in the drilling fluids circulation system, as required, or suitably disposed of in other acceptable ways.

A particular advantage of the system 10 resides in the arrangement of the filter 72 which provides for a filter media which may be disposed of and treated together with the solids fines which are removed from the filtrate fluid. Since the filter media comprising the solid particles 114 and a water-like substance which provides the precoat slurry may be treated by the dryer 22 and the solid particles 114 which are dried by the dryer discharged into the environment, the solids separated from the drill cuttings slurry or a similar based stream, together with the filter media, may be treated in the same manner and disposal efforts are minimized. The filter media or material making up the layer or coating 100 may be of a type commercially available, such as a diatomaceous earth composition manufactured under the trademark Celite by Johns Manville Corporation, Denver, Colo.

In a preferred method of operating the system 10 in accordance with the present invention, the filter 72 may be prepared for receiving a flow stream of condensate and solids fines from the tank 60 by precoating the element 76 with a suitably thick layer 100 of filter media. Assuming that the tank 78 is initially empty, it is then at least partially filled with the filter media slurry from the tank 80 by way of the conduit 82. The valve 88 is in the closed position to prevent loss of filter media from the tank 78. When a suitably thick layer 100 is applied to the drum 74, the tank 78 is emptied and excess filter media returned to tank 80.

A feed stream of drill cuttings slurry is presented to the dryer 22 through the conduit 20 and the dryer is operated to vaporize the liquids in the slurry stream for discharge from the dryer to the condenser 50. An initial charge of liquid such as clear water may be present in the chamber 61 for being pumped through the circuit comprising the pump 66, the heat exchanger 68, and the nozzle array 54. Dried cuttings are discharged from the dryer 22 through the conduit 40 and at least a portion of the cuttings may be recirculated as needed to control the consistency of the feed stream entering the port 34. The mixture of vapor and solid fines entering the chamber 56 is condensed, discharged into the tank 60 and allowed to undergo a gravity separation process.

When the liquid and solid fines mixture in the tank 60 reaches a level which will allow it to be discharged into the conduit 70, the tank 78 is filled with this mixture and the pump 106 is started to commence drawing the mixture onto the filter media layer 100 whereby the liquid filters through the layer and into the chamber 104 while the solid fines are collected and entrapped in the filter media. The knife 11 is operated to begin shaving a thin layer of filter media from the layer 100 and entrapped solid fines off and into the trough 120 whereby it is conveyed by the conduits 89 and 90, the conveyor 92 and conduit 94 to the feed stream inlet conduit 20 for treatment by the dryer 22. It is contemplated that the relatively viscous layer of filter media and entrapped solids fines filtered from the drill cuttings liquids and fines mixture will progress through the dryer 22 and tend to agglomerate with larger solids particles, be suitably dried to evaporate the liquids and whereby then the solids fines and dried filter media agglomerated on to other solids particles will be discharged as dried solids through the conduit 40. Liquid withdrawn through the chamber 104 into the tank 108 is then pumped into the separator 124 for separation into respective water and oil fractions for further treatment. For example, the oil may be stored and used as an additive for the drilling fluid and the clarified water may be handled in a similar manner or discharged directly overboard into the sea. When the precoated filter media layer 100 has been reduced to a thickness that will no longer provide suitable filtration, the flow of filtrate to the tank 78 is cut off, the tank drained through the conduit 86 and the conveyor 92 back to the dryer 22 and a fresh charge of filter media is discharged into the tank 78 to recoat the drum 74. During this time the level in the tank 60 may be allowed to build up to prevent shutdown of the dryer 22 and the condenser 50 or the recoating of the filter 72 may be carried out during shutdown of drilling operations for various reasons.

Those skilled in the art will appreciate that the method of the present invention and the system 10 provide a unique improvement in the handling of slurries of solids which cannot be separated and treated by prior art methods. The use of the system 10 in offshore as well as onshore drilling operations and in other applications for handling oily solids slurries is particularly advantageous. The rotary type dryer apparatus is particularly and surprisingly advantageous for handling slurries of solids, oil and water of a type typically produced in well drilling operations, and may be included in a system of a type disclosed in U.S. patent application Ser. No. 796,349 filed Nov. 8, 1985, in the name of James L. Skinner, and the condensing system for the vapor and solids fines stream is also described and claimed in U.S. patent application Ser. No. 727,311 filed Apr. 19, 1985 and issued as U.S. Pat. No. 4,683,963, also in the name of James L. Skinner, both applications being assigned to the assignee of the present invention.

Although a preferred embodiment of the present invention has been described in detail herein, those skilled in the art will recognize that the inventive features may be subject to various substitutions and modifications without departing from the scope and spirit of the invention recited in the appended claims.

What we claim is:

1. A method for treating a mixture which includes liquid oil and solids comprising the steps of:

providing dryer means for receiving said mixture, said dryer means being operable to form vapor of said oil and dry said solids;
conducting said mixture through said dryer means to vaporize liquid oil and produce solids fines and dry solids;
conducting said vapor and solids fines entrained with said vapor from said dryer means and condensing said vapor to produce a mixture of liquid and entrained solids fines;
providing filter means including a filter media comprising a quantity of solid particles;
passing a mixture of said liquid and entrained solids fines through said filter means to entrap said solids fines in said filter media;
removing a mixture of said filter media and solids fines from said filter means;
conveying said mixture of filter media and solids fines to said dryer means; and
drying the mixture of filter media and said solids fines and discharging said filter media and said solids fines with solids from said dryer means.

2. The method set forth in claim 1 including the step of:
drawing the mixture of liquid and solids fines through said filter media with a vacuum pump to provide a liquid filtrate substantially free of solids fines.

3. The method set forth in claim 2 including the step of:
separating liquids produced in said filtrate.

4. The method set forth in claim 1 wherein:
the step of condensing said vapors is carried out by mixing said vapors and entrained solids fines with a stream of said mixture of said liquid and entrained solids fines in a closed vessel.

5. The method set forth in claim 1 wherein:
said filter media is applied to a generally cylindrical drum of said filter means and said mixture of said filter media and entrapped solids fines is removed from said drum after collection of a predetermined amount of solids fines entrapped in said filter media from said mixture of said liquid and solids fines.

6. The method set forth in claim 5 including the step of:
conveying said filter media and entrapped solids fines removed from said filter drum to said dryer means for drying said filter media and entrapped solids fines together with a flow stream of said mixture of liquid oil and solids to be dried.

7. The method set forth in claim 1 wherein: said filter media comprises at least one of diatomaceous earth and perlite.

8. A system for treating a mixture containing at least solid particles and liquid oil to dry said solid particles for disposal to the earth, said system comprising:
dryer means including an inlet conduit for receiving said mixture in said dryer means, said dryer means being operable to dry said solid particles by vaporizing the liquid oil in said dryer means and to discharge substantially dried solid particles for disposal, said dryer means including means for discharging a flowstream of vapor comprising liquid oil vaporized from said mixture and solids fines of said solid particles entrained with said vapor;
condenser means connected to said dryer means for receiving and condensing the vapor in said flowstream of vapor and solids fines;
filter means for receiving a flowstream of liquid and entrained solids fines from said condenser means, said filter means including a filter media comprising solid particles;
means for forcing said flowstream of liquid and entrained solids fines to pass through said filter media to entrap said solids fines and provide a substantially solids free flowstream of liquid;
means for removing said filter media and entrapped solids fines from said filter means; and
means for conveying said filter media and entrapped solids fines to said dryer means for treatment to dry said filter media and said solids fines with said mixture of liquid oil and solid particles and for disposal of said filter media and said solids fines with said solid particles being discharged from said dryer means.

9. The system set forth in claim 8 including:
means for receiving said solids free flowstream of liquid and separator means for separating oil in said solids free flowstream of liquid from water in said solids free flowstream of liquid.

10. The system set forth in claim 8 wherein:
said condenser means includes vessel means and means in said vessel means for mixing a condensing liquid flowstream with said flowstream of vapor and entrained solids fines to condense said vapor, said condensing liquid flowstream comprising at least in part liquid condensed from said flowstream of vapor.

11. The system set forth in claim 10 including:
conduit means including a heat exchanger connected to said condenser means for conducting a liquid flowstream from said condenser means through said heat exchanger and back to said condenser means for use as said condensing liquid.

12. The system set forth in claim 8 including:
a surge tank including an inlet conduit and a chamber for receiving a mixture of liquid and solids fines formed from said flowstream of vapor and entrained solids fines to permit settling of at least some of said solids fines, and an outlet conduit leading from said tank to said filter means for conveying liquid with entrained solid fines to said filter media.

13. The system set forth in claim 8 wherein:
said filter means includes a rotary vacuum drum filter including a foraminous member forming a filter support surface, tank means for receiving a quantity of said filter media for coating said filter media on said member and conduit means for discharging filter media to said dryer means.

14. The system set forth in claim 13 including:
means for shaving a layer of filter media from said filter drum progressively to remove filter media contaminated with entrapped solid fines, and means for conveying said filter media with entrapped solid fines to said dryer means.

15. The system set forth in claim 8 wherein:
said filter media comprises at least one of diatomaceous earth and perlite.

16. A system for treating a slurry of earth drill cuttings containing solid particles and oil to dry said solid particles for disposal to the earth, said system comprising:
dryer means including an inlet conduit for receiving said slurry in said dryer means, said dryer means being operable to vaporize the liquids in said slurry and to discharge substantially dried solid particles for disposal, said dryer means including conduit means for discharging a flowstream of vapor comprising liquids vaporized from said slurry and solid fines of said solid particles entrained with said vapor;

condenser means connected to said dryer means for condensing the vapor in said flowstream of vapor and solid fines, said condenser means including means for mixing a liquid flowstream with said flowstream of vapor and solid fines to condense said vapor, said liquid flowstream comprising at least in part liquid condensed from said flowstream of vapor;

a precoat filter for receiving a flowstream of liquid and entrained solid fines, said filter including a filter support surface and a precoat filter media comprising solid particles comprising at least one of diatomaceous earth and perlite and forming a coating on said filter support surface;

means for causing said flowstream of liquid and entrained solid fines to pass through said filter media to entrap said solid fines in said filter media and provide a substantially solids free flowstream of liquid; and means for removing said filter media and entrapped solid fines from said filter support surface; and means for conveying said filter media and entrapped solid fines to said dryer means for treatment to dry said filter media and entrapped solid fines and for disposal with said solid particles being discharged from said dryer means.

17. The system set forth in claim 16 including:

conduit means including a heat exchanger connected to said condenser means for conducting said liquid flowstream from said condenser means and back to said condenser means for use as a liquid for mixing with said vapor to condense said vapor.

18. The system set forth in claim 16 including:

a surge tank including an inlet conduit and a chamber for receiving a mixture of liquid formed from said flowstream of condensed vapor and entrained solid fines to permit settling of at least some of said solid fines, and an outlet conduit leading from said tank to said filter means for conveying liquid with entrained solid fines to said filter media.

* * * * *